United States Patent
Degner et al.

(10) Patent No.: US 11,031,834 B2
(45) Date of Patent: Jun. 8, 2021

(54) ELECTRIC MACHINE ROTOR END PLATE WITH RAISED FLOW FEATURES

(71) Applicant: Ford Global Technologies, LLC, Dearborn, MI (US)

(72) Inventors: Michael W. Degner, Novi, MI (US); Edward Chan-Jiun Jih, Troy, MI (US); Myung Ki Sung, Ypsilanti, MI (US); Prasad Dev Hanumalagutti, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 300 days.

(21) Appl. No.: 15/951,325

(22) Filed: Apr. 12, 2018

(65) Prior Publication Data

US 2019/0319505 A1 Oct. 17, 2019

(51) Int. Cl.
*H02K 1/32* (2006.01)
*H02K 1/30* (2006.01)

(52) U.S. Cl.
CPC ............... *H02K 1/32* (2013.01); *H02K 1/30* (2013.01)

(58) Field of Classification Search
CPC .. H02K 1/32; H02K 1/30; H02K 9/00; H02K 9/005; H02K 9/02; H02K 9/06; H02K 9/04; H02K 9/19; H02K 9/22
USPC ...... 310/52–65, 216.114, 216.119, 400, 402, 310/405, 411, 417, 412, 261.1, 262–269
See application file for complete search history.

(56) References Cited

U.S. PATENT DOCUMENTS

| | | | |
|---|---|---|---|
| 3,782,853 A * | 1/1974 | Frister | F04D 29/287 416/132 R |
| 3,849,680 A | 11/1974 | Heller | |
| 5,144,175 A * | 9/1992 | Graggs | H02K 1/32 310/61 |
| 5,925,960 A * | 7/1999 | Hayes | H02K 9/06 29/889.3 |
| 5,994,804 A * | 11/1999 | Grennan | H02K 1/32 310/58 |
| 6,234,767 B1 * | 5/2001 | Takeda | H02K 1/276 417/355 |
| 8,242,646 B2 * | 8/2012 | Tatematsu | B60L 15/2054 310/61 |
| 8,299,663 B2 | 10/2012 | Eriksen et al. | |
| 9,401,630 B2 | 7/2016 | Garrard et al. | |
| 9,479,028 B2 * | 10/2016 | Akiyoshi | H02K 11/046 |
| 9,660,504 B2 | 5/2017 | Koga et al. | |
| 2003/0132673 A1 * | 7/2003 | Zhou | H02K 1/32 310/54 |
| 2003/0193256 A1 * | 10/2003 | Liebermann | H02K 9/22 310/194 |
| 2004/0163428 A1 * | 8/2004 | Kim | D06F 37/264 68/140 |
| 2010/0133927 A1 * | 6/2010 | Zhang | H02K 1/30 310/43 |

(Continued)

*Primary Examiner* — Maged M Almawri
(74) *Attorney, Agent, or Firm* — David B. Kelley; Brooks Kushman P.C.

(57) ABSTRACT

An automotive motor includes a stator and a rotor disposed within the stator. The automotive motor also includes an endplate attached to the rotor that defines a coolant exit hole, an outer edge, and an array of staggered raised flow disruptors disposed radially between the coolant exit hole and outer edge. The array disrupts flow of coolant as the coolant travels from the coolant exit hole along a surface of the endplate toward the outer edge.

20 Claims, 5 Drawing Sheets

(56) References Cited

U.S. PATENT DOCUMENTS

| | | | |
|---|---|---|---|
| 2010/0237725 A1* | 9/2010 | Tatematsu | B60L 50/16 |
| | | | 310/61 |
| 2010/0320850 A1* | 12/2010 | Lemmers, Jr. | H02K 1/32 |
| | | | 310/54 |
| 2011/0309697 A1* | 12/2011 | Kirkley, Jr. | H02K 5/20 |
| | | | 310/54 |
| 2012/0025642 A1* | 2/2012 | Onimaru | H02K 1/32 |
| | | | 310/64 |
| 2012/0299404 A1* | 11/2012 | Yamamoto | H02K 1/32 |
| | | | 310/61 |
| 2013/0101394 A1* | 4/2013 | Franzen | H02K 9/193 |
| | | | 415/71 |
| 2014/0015351 A1 | 1/2014 | Marvin et al. | |
| 2014/0191623 A1* | 7/2014 | Hillenbrand | H02K 5/10 |
| | | | 310/60 R |
| 2014/0333163 A1* | 11/2014 | Horii | H02K 1/32 |
| | | | 310/59 |
| 2015/0171708 A1* | 6/2015 | Akiyoshi | H02K 9/06 |
| | | | 310/60 A |
| 2016/0261158 A1* | 9/2016 | Horii | H02K 1/274 |
| 2016/0261169 A1* | 9/2016 | Rawlinson | H02K 1/32 |
| 2017/0338720 A1* | 11/2017 | Mayor | H02K 1/32 |
| 2018/0062463 A1* | 3/2018 | Ito | H02K 1/24 |
| 2018/0123428 A1* | 5/2018 | Sturm | H02K 9/08 |
| 2018/0183297 A1* | 6/2018 | Akiyoshi | H02K 9/06 |
| 2019/0109503 A1* | 4/2019 | Hopkins | H02K 9/06 |
| 2019/0109515 A1* | 4/2019 | Hopkins | H02K 1/28 |
| 2019/0207451 A1* | 7/2019 | Yoshizawa | H02K 1/2766 |
| 2019/0238017 A1* | 8/2019 | Ohira | H02K 1/32 |
| 2019/0288588 A1* | 9/2019 | Sato | H02K 17/16 |
| 2019/0312475 A1* | 10/2019 | Seidl | H02K 1/30 |
| 2019/0334409 A1* | 10/2019 | Dib | H02K 9/18 |

* cited by examiner

ELECTRIC MACHINE ROTOR END PLATE WITH RAISED FLOW FEATURES

TECHNICAL FIELD

This disclosure relates to the cooling of automotive electric machines.

BACKGROUND

Certain electrified vehicles may rely on a traction battery to provide power to a traction motor for propulsion, and a power inverter therebetween to convert direct current power to alternating current power. Such a traction motor is typically a three-phase motor powered by three sinusoidal signals each driven with 120 degrees phase separation. Other configurations, however, are also possible.

SUMMARY

A motor assembly includes a shaft defining a passageway for coolant, a rotor fixedly attached to the shaft, and an endplate held against the rotor. The endplate defines a plenum in fluid communication with the passageway, an exit hole piercing the plenum, an outer edge, and an array of raised repeating geometrically shaped flow disruptors disposed in staggered rows that are radially outside the exit hole and aligned with the outer edge. The staggered rows may be spaced away from each other at differing distances. The raised repeating geometrically shaped flow disruptors may be rectangular walls. The raised repeating geometrically shaped flow disruptors may be cylinder shaped walls. The raised repeating geometrically shaped flow disruptors may be V shaped walls. The raised repeating geometrically shaped flow disruptors may be S shaped walls. The array may define a triangular, trapezoidal, hexagonal, cross, or sector shape.

An automotive rotor assembly includes a rotor and a rotor endplate attached to the rotor. The rotor endplate defines a passageway for coolant, and has an exterior surface, an exit hole for the coolant, and an array of repeating flow disruptors extending away from the exterior surface and disposed radially outside of the exit hole such that coolant from the exit hole flowing along the exterior surface encounters the array. The repeating flow disruptors may be further disposed in staggered rows. The staggered rows may be spaced away from each other at differing distances. The repeating flow disruptors may be disposed in a single row. The repeating flow disruptors may be walls. The walls may have sharp corners. The walls may have rounded corners. The array may define a triangular, trapezoidal, hexagonal, cross, or sector shape.

An automotive motor includes a stator, a rotor disposed within the stator, and an endplate attached to the rotor. The endplate defines a coolant exit hole, an outer edge, and an array of staggered raised flow disruptors disposed radially between the coolant exit hole and outer edge. The array disrupts flow of coolant as the coolant travels from the coolant exit hole along a surface of the endplate toward the outer edge. The raised flow disruptors may be rectangular shaped walls. The raised flow disruptors may be cylinder shaped walls. The raised flow disruptors may be V shaped walls. The raised flow disruptors may be S shaped walls.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Figure 1:
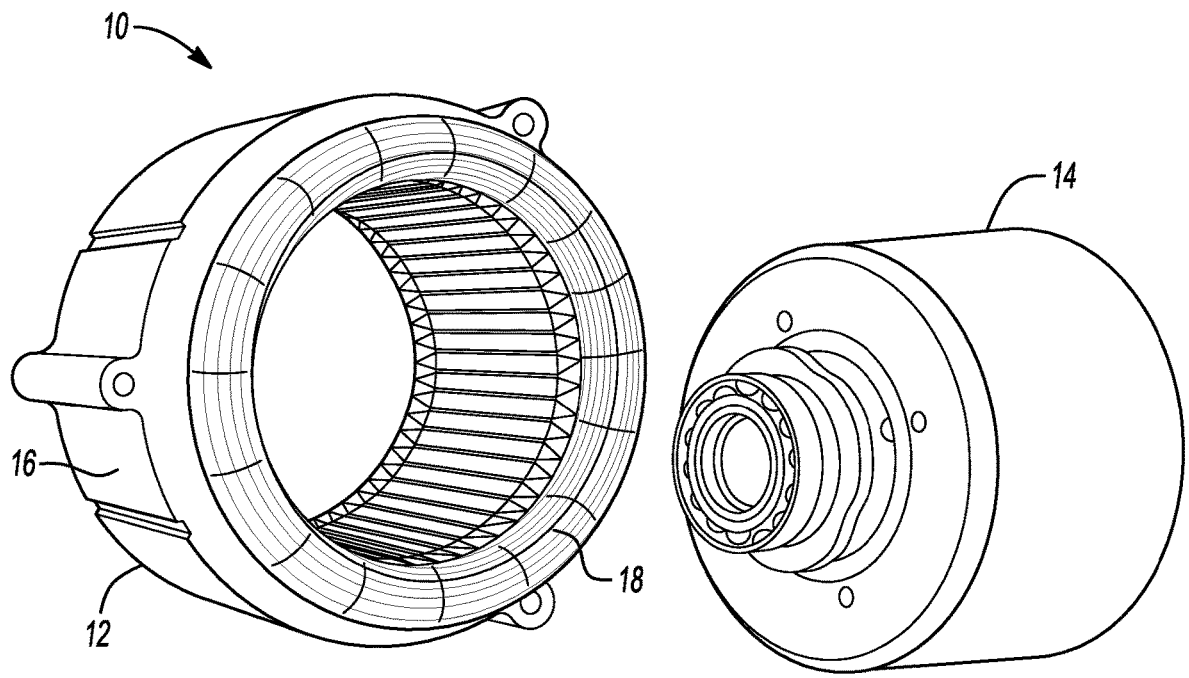
FIG. 1 is an exploded assembly view of portions of an electric motor.
Figure 2A:
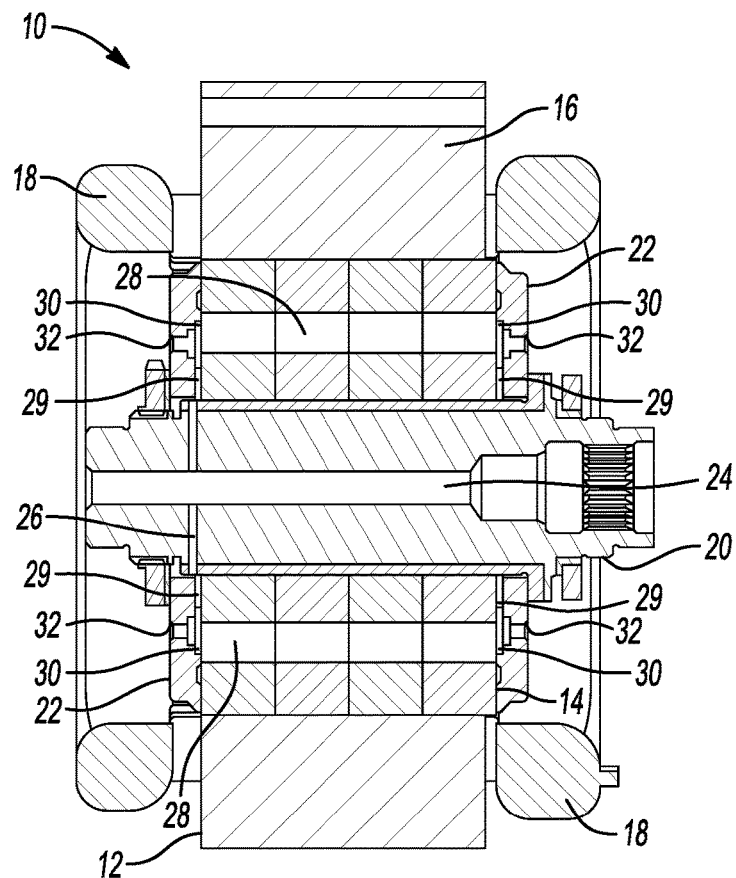
FIGS. 2A and 2B are side views, in cross-section, of an electric motor with and without coolant respectively.
Figure 2B:
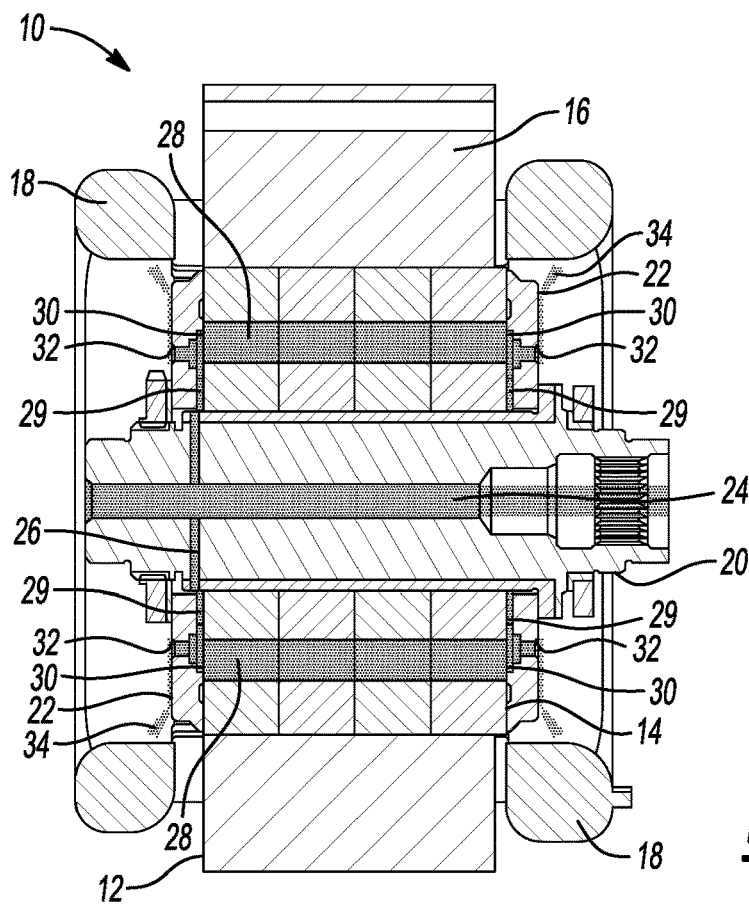
Figure 3A:
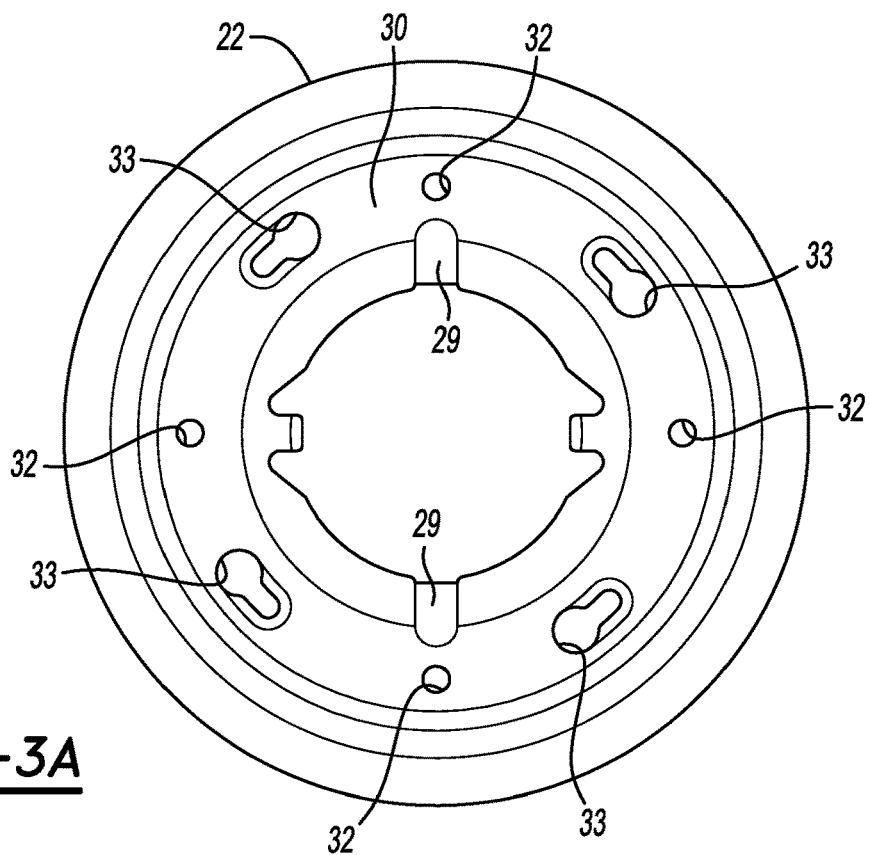
FIGS. 3A and 3B are plan views of an interior side of a rotor end plate with and without coolant respectively.
Figure 3B:
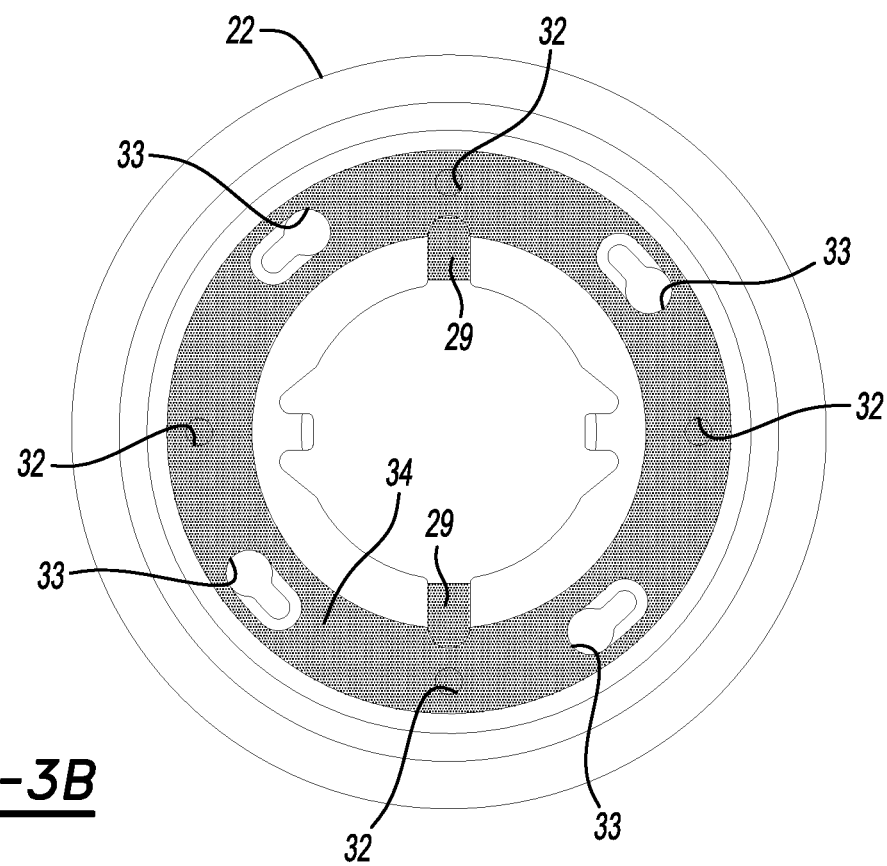

With reference to FIG. 1, a motor 10 may include a stator 12 and a rotor 14 as shown in FIG. 1. The stator primary components include an iron core 16 (magnetic steel laminations) and copper windings 18. During normal operation, the copper windings 18 carry current generating heat. Some heat is also generated in the iron core 16. This heat can be removed by using a cooling medium (such as transmission oil) which reduces the temperature of the copper windings 18 thereby providing the ability to increase current through them. The exposed portions of the copper windings 18 (those protruding from the iron core 16), known as the end winding, provide the primary path for heat extraction.

With reference to FIGS. 2A, 2B, 3A, and 3B, the motor 10 further includes a shaft 20 passing through and fixedly engaged with the rotor 14, and rotor end plates 22 covering respective ends of the rotor 14. The shaft 20 defines axial and radial fluid passageways 24, 26. The rotor 14 includes fluid passageways 28 extending between the rotor end plates 22. And the rotor end plates 22 define radial fluid passageways 29, plenums 30, coolant exit holes 32, and balancing holes 33. The fluid passageways 24, 26, 28, 29 and plenums 30 are in fluid communication with one another. The motor 10 may thus be cooled by spraying automotive transmission oil (or other coolant) 34 from the rotor 14. This strategy, however, may lead to sparse coverage of coolant over the copper windings 18 and areas with high temperature due to non-uniformity of the coolant.

In rotor spray cooling, the coolant 34 enters the axial fluid passageway 24 and due to the different orifices designed in the automotive transmission line, pressure builds up along the shaft 20. Because of this pressure, the coolant 34 rises along the radial fluid passage 26 on the shaft 20 and enters the fluid passageways 28, 29 and plenums 30. When the plenums 30 are filled with the coolant 34 or the coolant 34 reaches the level of the exit holes 32, it overflows over the thickness of the rotor end plates 22 and reaches outsides of the rotor end plates 22. As the rotor 14 is spinning, these layers on the rotor end plates 22 are ejected onto the copper windings 18 due to the centrifugal force. Upon reaching the surface of the copper windings 18, heat is absorbed from the surface to the coolant 34 to achieve the necessary cooling.

Here, flow enhancement features on the exterior of rotor end plates are proposed to improve end winding cooling. In some examples, flow disruptive features break smooth flowing coolant layers into multiple streams before they are flung from the rotor end plate surface. By breaking these layers into finer coolant streams, there is a possibility to cover a larger area on the end winding surface and thereby remove heat more efficiently. Upon exiting the oil holes, coolant can contact an array of protruding features that disturb the coolant flow. These features can be added between the oil holes and outer edges of the rotor end plates.

Figure 4:
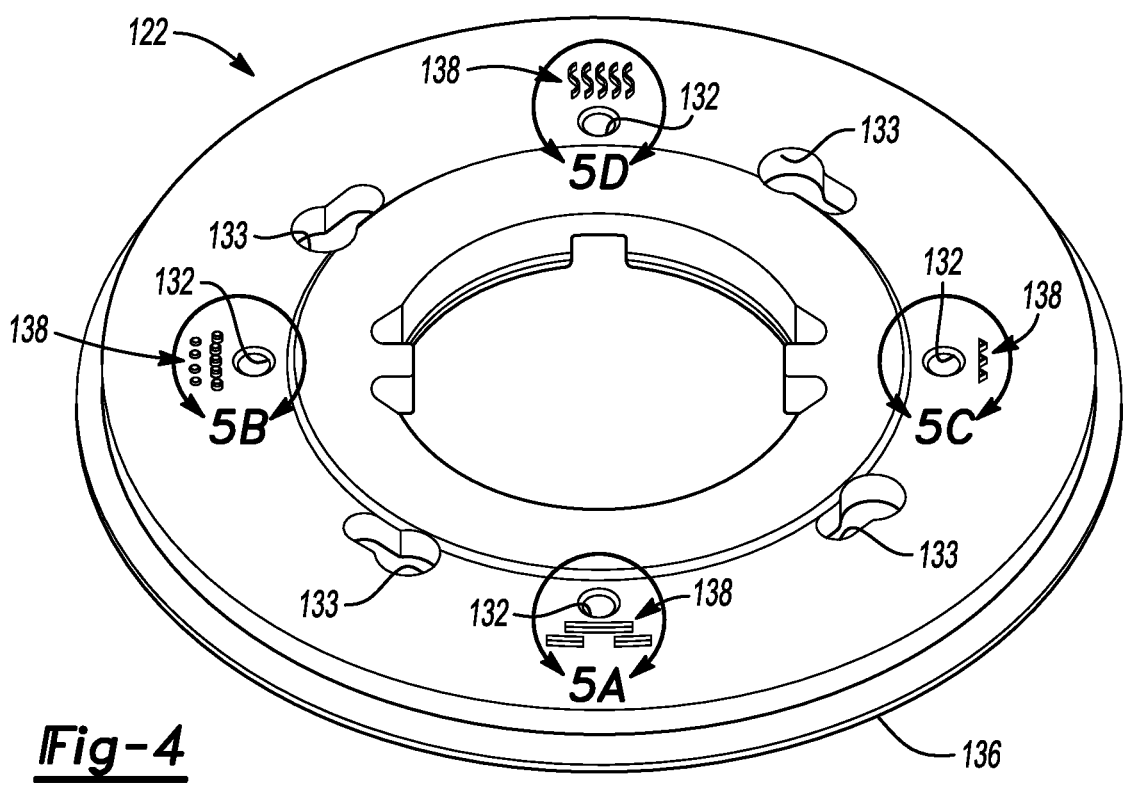
FIG. 4 is a perspective of an exterior side of another rotor end plate.

With reference to FIG. 4, a rotor end plate 122 includes exit holes 132, balance holes 133, an outer edge 136, and arrays 138 of flow disruptors disposed radially between each of the exit holes 132 and outer edge 136. (Like numbered elements may share similar descriptions.) In the example of FIG. 4, each of the arrays of flow disruptors 138 is different. In other examples, they may be the same, or some may be omitted. And they may be offset from the exit holes 132 as opposed to being radially aligned with them as shown, etc.

As the coolant layer builds on the exterior of the rotor end plate 122 by way of the mechanisms described above, it encounters the arrays of flow disruptors 138, which force the coolant layer into smaller streams as it flows there around. These streams may flow further toward the outer edge 136 with more randomness than a smooth layer—increasing the distribution and coverage area of coolant launched onto end windings thereby increasing the effectiveness of the spray cooling.

Figure 5A:
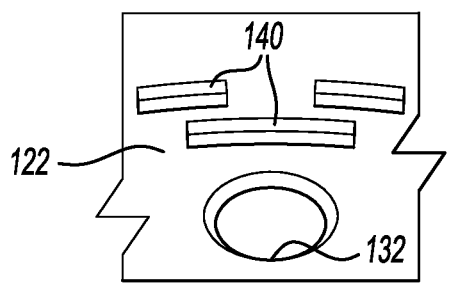
FIGS. 5A through 5D are perspectives view of rotor end plate raised flow features.

With reference to FIG. 5A, the array 138 of flow disruptors takes the form of two rows of staggered rectangular shaped walls 140 of differing length, each aligned with the outer edge 136, and offset from one another. In the example of FIG. 5A, longer walls are formed closer to the exit hole 132. The rectangular shape walls 140, however, may be positioned and arranged as desired. They may, for example, be arranged at an angle or perpendicular to the position shown. A fewer or greater number of walls may also be used, etc.

Figure 5B:
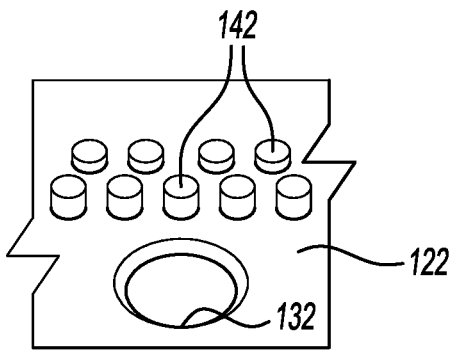

With reference to FIG. 5B, the array 138 of flow disruptors takes the form of two rows of staggered cylinder shaped walls 142 of differing height and/or diameter, and offset from one another. In the example of FIG. 5B, taller and thicker cylinder shaped walls are formed closer to the exit hole 132. The cylinder shaped walls 142, however, may be positioned and arranged as desired. Unlike the example of FIG. 5A, the two rows of staggered cylinder shaped walls 142 are in straight rows rather than being generally aligned with the outer edge 136.

Figure 5C:
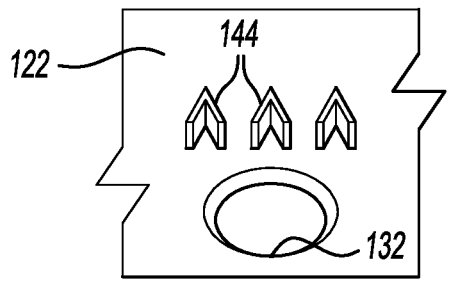

With reference to FIG. 5C, the array 138 of flow disruptors takes the form of a single row of V shaped walls 144. In the example of FIG. 5C, the V shaped walls 144 are pointed toward the outer edge 136. The V shaped walls 144, however, may be positioned and arranged as desired. They may, for example, be pointed toward the exit hole, etc.

Figure 5D:
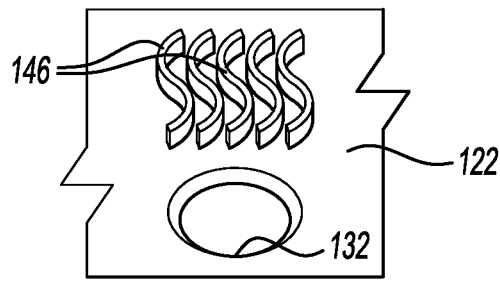

With reference to FIG. 5D, the array of flow disruptors 138 takes the form of S shaped walls 146. In the example of FIG. 5D, the S shaped walls 146 are aligned radially next to one another relative to the exit hole 132. The S shaped walls 146, however, may be positioned and arranged as desired.

Figure 6:
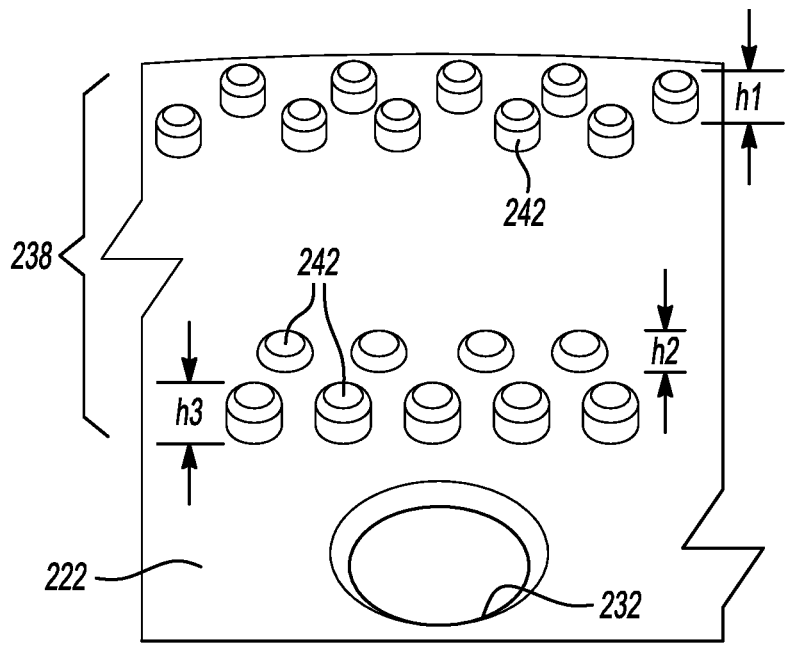
FIG. 6 is another perspective view of rotor end plate raised flow features.

With reference to FIG. 6, a rotor end plate 222 includes an exit hole 232 and an array 238 of flow disruptors. Here, the array 238 of flow disruptors takes the form of cylinder shaped walls 242 like FIG. 5B. But, two rows are placed adjacent one another near the exit hole 232, and a third row is spaced away from the two rows to form a gap therebetween. The rows of cylinder shaped walls 242 have differing heights like FIG. 5B with the row closest to the exit hole 232 being the tallest and the row furthest from the exit hole 232 being the next tallest. Thus, any number of rows for any flow disruptor shape can be used and spaced as desired.

Figure 7:
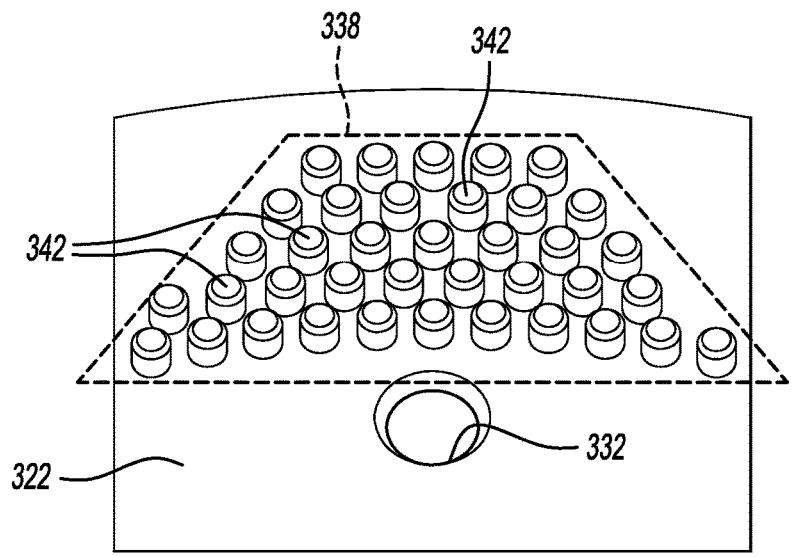
FIG. 7 is a perspective view of rotor end plate flow feature layout.

With reference to FIG. 7, a rotor end plate 322 includes an exit hole 332 and an array 338 of flow disruptors. Here, the array 348 of flow disruptors is arranged to form, loosely speaking, a trapezoid. In this example, the array of flow disruptors 338 takes the form of cylinder shaped walls 342. They could, of course, also take other forms as desired.

Figure 8A:
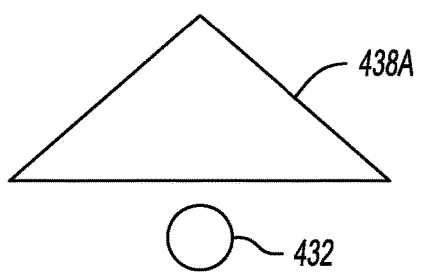
FIGS. 8A through 8E are schematic views of rotor end plate flow feature layouts.
Figure 8B:
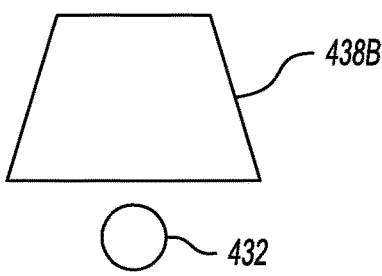
Figure 8C:
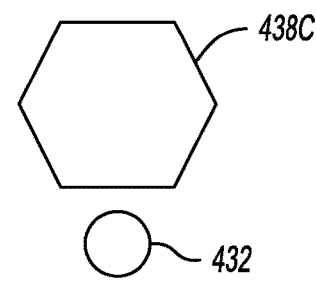
Figure 8D:
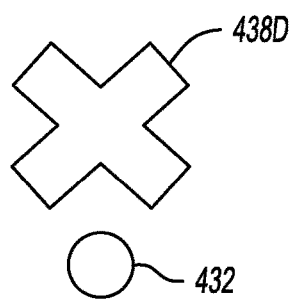
Figure 8E:
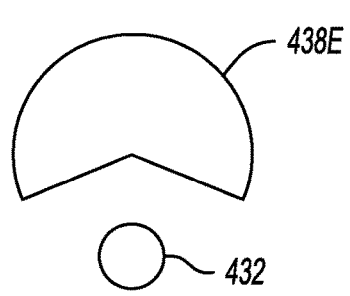

With reference to FIGS. 8A through 8E, various shapes for arrays 438A through 438E of flow disruptors are shown respectively. FIG. 8A shows that the array of flow disruptors 438A may be arranged to form, loosely speaking, a triangle. And FIGS. 8B through 8E show that the arrays of flow disruptors 438B through 438 E may be arranged to form, loosely speaking, another trapezoid, a hexagon, a cross, or a sector, respectively. Other shapes are, of course, also possible.

Testing or simulation may be used to identify the placement, shape, and geometry best suited for a particular application as rotor end plate diameter and expected operating speeds may influence rotor endplate coolant layer thickness.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. Other variations are also contemplated. Edges of the contemplated features may be sharp or rounded off. Round edges may affect any resulting flow. The features may be distributed into different rows and columns and into uniform, staggered, or spiral patterns. The height of the features could vary. A few features may be disposed right next to the oil hole and another set of features disposed close to the outer edge of the end plate. There could be a variable gap between these two sets of features. A layout of features may be individually distributed within an outer enclosed shape. And, the density of feature distribution, height, and gap within the outer enclosed shape could vary. The surface of features along the perpendicular or radial direction to the end plate can be smooth, rough, or corrugated to aid in splitting of the coolant streams. Other scenarios are also contemplated.

While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A motor assembly comprising:
   a shaft defining a passageway for coolant;
   a rotor fixedly attached to the shaft; and
   an endplate held against the rotor, and defining a plenum in fluid communication with the passageway, a plurality of exit holes piercing the plenum, an outer edge, and a plurality of arrays of raised repeating geometrically shaped flow disruptors disposed on an exterior face of the endplate opposite an interior face of the endplate that is adjacent to the rotor and in staggered rows that are radially outside the exit holes and aligned with the outer edge, wherein the raised repeating geometrically shaped flow disruptors of one of the arrays are different than the raised repeating geometrically shaped flow disruptors of another of the arrays.

2. The motor assembly of claim 1, wherein the staggered rows are spaced away from each other at differing distances.

3. The motor assembly of claim 1, wherein some of the raised repeating geometrically shaped flow disruptors are rectangular walls.

4. The motor assembly of claim 1, wherein some of the raised repeating geometrically shaped flow disruptors are cylinder shaped walls.

5. The motor assembly of claim 1, wherein some of the raised repeating geometrically shaped flow disruptors are V shaped walls.

6. The motor assembly acclaim 1, wherein some of the raised repeating geometrically shaped flow disruptors are S shaped walls.

7. The motor assembly of claim 1, wherein at least one of the arrays defines a triangular, trapezoidal, hexagonal, cross, or sector shape.

8. An automotive rotor assembly comprising:
   a rotor; and
   a rotor endplate attached to the rotor to define a passageway for coolant therebetween, the rotor endplate having an interior surface adjacent to the rotor and an exterior surface opposite the interior surface, a plurality of exit holes for the coolant, and a plurality of arrays of repeating flow disruptors extending away from the exterior surface and disposed radially outside of the exit holes such that coolant from the exit holes flowing along the exterior surface encounters at least one of the arrays, wherein the repeating flow disruptors of one of the arrays are different than the repeating flow disruptors of another of the arrays.

9. The automotive rotor assembly of claim 8, wherein the repeating flow disruptors are disposed in a single row.

10. The automotive rotor assembly of claim 8, wherein at least one of the arrays defines a triangular, trapezoidal, hexagonal, cross, or sector shape.

11. The automotive rotor assembly of claim 8, wherein the repeating flow disruptors are further disposed in staggered rows.

12. The automotive rotor assembly of claim 11, wherein the staggered rows are spaced away from each other at differing distances.

13. The automotive rotor assembly of claim 8, wherein some of the repeating flow disruptors are walls.

14. The automotive rotor assembly of claim 13, wherein some of the walls have sharp corners.

15. The automotive rotor assembly of claim 13, wherein some of the walls have rounded corners.

16. An automotive motor comprising:
    a stator;
    a rotor disposed within the stator; and
    an endplate attached to the rotor, and defining a plurality of coolant exit holes, an outer edge, and a plurality of arrays of staggered raised flow disruptors disposed on an exterior surface of the endplate opposite an interior face of the endplate that is adjacent to the rotor and radially between the coolant exit holes and outer edge, wherein the arrays are configured to disrupt flow of coolant as the coolant travels from the coolant exit holes along a surface of the endplate toward the outer edge and wherein the raised flow disruptors of one of the arrays are different than the raised flow disruptors of another of the arrays.

17. The automotive motor of claim 16, wherein some of the raised flow disruptors are rectangular shaped walls.

18. The automotive motor of claim 16, wherein some of the raised flow disruptors are cylinder shaped walls.

19. The automotive motor of claim 16, wherein some of the raised flow disruptors are V shaped walls.

20. The automotive motor of claim 16, wherein some of the raised flow disruptors are S shaped walls.

\* \* \* \* \*